United States Patent
King et al.

(10) Patent No.: US 12,269,127 B2
(45) Date of Patent: Apr. 8, 2025

(54) VEHICULAR WINDOW ASSEMBLY PROCESS WITH TEMPERATURE CONTROL OF THE SOLDER JOINT THAT ATTACHES AN ELECTRICAL CONNECTOR

(71) Applicant: Magna Exteriors, Inc., Troy, MI (US)

(72) Inventors: David M. King, Hudsonville, MI (US); Jeremiah S. Busscher, Dorr, MI (US); Seth T. Hembree, Grand Rapids, MI (US)

(73) Assignee: Magna Exteriors, Inc., Troy, MI (US)

( * ) Notice: Subject to any disclaimer, the term of this patent is extended or adjusted under 35 U.S.C. 154(b) by 57 days.

(21) Appl. No.: 18/303,712

(22) Filed: Apr. 20, 2023

(65) Prior Publication Data

US 2023/0339034 A1    Oct. 26, 2023

Related U.S. Application Data

(60) Provisional application No. 63/363,389, filed on Apr. 22, 2022.

(51) Int. Cl.
*B23K 1/00* (2006.01)
*B23K 1/002* (2006.01)
(Continued)

(52) U.S. Cl.
CPC .......... *B23K 3/0478* (2013.01); *B23K 1/0008* (2013.01); *B23K 1/0016* (2013.01);
(Continued)

(58) Field of Classification Search
CPC .. B23K 3/0478; B23K 1/0008; B23K 1/0016; B23K 1/002; B23K 3/0475; B23K 3/085;
(Continued)

(56) References Cited

U.S. PATENT DOCUMENTS

| 4,920,698 | A | 5/1990 | Friese et al. |
| 4,995,195 | A | 2/1991 | Olberding et al. |

(Continued)

FOREIGN PATENT DOCUMENTS

| CA | 2890287 A1 * | 5/2014 | ........... H01Q 1/1271 |
| CN | 102985207 A * | 3/2013 | ............. B23K 1/002 |

(Continued)

*Primary Examiner* — Kiley S Stoner
(74) *Attorney, Agent, or Firm* — HONIGMAN LLP

(57) ABSTRACT

A system for assembling a vehicular window assembly includes a heating device that, when electrically operated, heats an electrical connector disposed at a glass panel of a vehicular window assembly to heat and melt solder disposed between the electrical connector and an electrically conductive trace established at the glass panel to form a solder joint providing electrically-conductive connection between the electrical connector and the electrically conductive trace established at the glass panel. A temperature sensor captures sensor data indicative of a temperature of the electrical connector and the solder. The system, based on processing at an electronic control unit (ECU) of the captured sensor data, adjusts electrical operation of the heating device to adjust the temperature of the electrical connector and the solder during the soldering process that forms the solder joint.

18 Claims, 6 Drawing Sheets

(51) Int. Cl.
*B23K 3/00* (2006.01)
*B23K 3/047* (2006.01)
*B23K 3/08* (2006.01)
*B60J 1/00* (2006.01)
*B60J 1/18* (2006.01)
*B60R 16/03* (2006.01)
*B23K 101/36* (2006.01)

(52) U.S. Cl.
CPC ............ *B23K 1/002* (2013.01); *B23K 3/0475* (2013.01); *B23K 3/085* (2013.01); *B60J 1/002* (2013.01); *B60J 1/1853* (2013.01); *B60R 16/03* (2013.01); *B23K 2101/36* (2018.08)

(58) Field of Classification Search
CPC .......... B23K 2101/36; B23K 2101/006; B23K 2101/38; B23K 2103/18; B23K 2103/54; B23K 1/19; B23K 3/047; B23K 3/08; B23K 31/12–125; B60J 1/002; B60J 1/1853; B60R 16/03
USPC ................ 228/102–103, 8–12, 122.1–124.7; 219/615–616
See application file for complete search history.

(56) References Cited

U.S. PATENT DOCUMENTS

| | | |
|---|---|---|
| 5,146,712 A | 9/1992 | Hlavaty |
| 5,531,046 A | 7/1996 | Kollar et al. |
| 5,572,376 A | 11/1996 | Pace |
| 5,853,895 A | 12/1998 | Lewno |
| 6,068,719 A | 5/2000 | Lewno |
| 6,119,401 A | 9/2000 | Lin et al. |
| 6,319,344 B1 | 11/2001 | Lewno |
| 6,691,464 B2 | 2/2004 | Nestell et al. |
| 6,730,848 B1 * | 5/2004 | Antaya ................ B23K 1/0008 174/94 R |
| 6,793,120 B2 | 9/2004 | Johnson ............... B23K 1/0053 228/122.1 |
| 6,846,039 B2 | 1/2005 | Lewno |
| 6,955,009 B2 | 10/2005 | Rasmussen |
| 7,003,916 B2 | 2/2006 | Nestell et al. |
| 7,073,293 B2 | 7/2006 | Galer |
| 7,332,225 B2 | 2/2008 | Lewno |
| 7,833,070 B2 * | 11/2010 | Lyon ....................... H05B 3/84 228/124.1 |
| 7,838,115 B2 | 11/2010 | Lewno |
| 8,322,073 B2 | 12/2012 | Lewno |
| 8,402,695 B2 | 3/2013 | Smith et al. |
| 8,881,458 B2 | 11/2014 | Snider et al. |
| 9,579,955 B2 | 2/2017 | Snider |
| 9,896,026 B2 | 2/2018 | Snider |
| 10,357,840 B2 * | 7/2019 | Gleisberg ........... B23K 35/0238 |
| 10,427,503 B2 | 10/2019 | Snider |
| 10,501,008 B2 | 12/2019 | Snider |
| 10,501,977 B2 | 12/2019 | Snider |
| 10,524,313 B2 | 12/2019 | Snider et al. |
| 10,559,153 B2 | 2/2020 | Snider et al. |
| 10,668,868 B2 | 6/2020 | Snider et al. |
| 10,835,979 B2 * | 11/2020 | Pagel ..................... B23K 3/026 |
| 10,843,644 B2 | 11/2020 | Snider et al. |
| 11,458,557 B2 * | 10/2022 | Heo .................. H01R 43/0263 |
| 11,697,167 B2 * | 7/2023 | Reul ..................... B23K 3/0623 228/111.5 |
| 2003/0213179 A1 | 11/2003 | Galer |
| 2004/0020131 A1 | 2/2004 | Galer et al. |
| 2006/0107600 A1 | 5/2006 | Nestell et al. |
| 2007/0224842 A1 * | 9/2007 | Hoepfner ................. H05B 3/84 439/34 |
| 2008/0127563 A1 | 6/2008 | Tooker |
| 2010/0326983 A1 * | 12/2010 | Sitterlet ............. B23K 37/0443 219/635 |
| 2011/0056140 A1 | 3/2011 | Lewno |
| 2013/0119048 A1 * | 5/2013 | Martin .................. B23K 1/002 219/615 |
| 2013/0174488 A1 | 7/2013 | Snider et al. |
| 2013/0333929 A1 * | 12/2013 | Ogawa ................. B23K 35/262 174/257 |
| 2013/0334290 A1 * | 12/2013 | Lee ....................... B23K 3/0623 228/33 |
| 2015/0024642 A1 * | 1/2015 | Ash ........................ B23K 1/002 219/616 |
| 2015/0101415 A1 * | 4/2015 | Kopp ..................... B23K 31/02 65/36 |
| 2017/0264024 A1 * | 9/2017 | Schneider ................ H01R 4/02 |
| 2019/0357316 A1 * | 11/2019 | Douma .................. B60J 1/1846 |
| 2019/0383084 A1 | 12/2019 | Snider et al. |
| 2021/0039481 A1 | 2/2021 | Snider et al. |
| 2021/0070241 A1 | 3/2021 | Snider et al. |
| 2021/0291286 A1 * | 9/2021 | Reul ........................ H05B 6/42 |
| 2022/0072992 A1 | 3/2022 | Snider |
| 2022/0295603 A1 | 9/2022 | Snider et al. |

FOREIGN PATENT DOCUMENTS

| | | | | |
|---|---|---|---|---|
| CN | 103658908 A | * | 3/2014 | ............ B23K 1/002 |
| CN | 103990882 A | * | 8/2014 | ............ B23K 1/0008 |
| CN | 104227254 A | * | 12/2014 | ............ B23K 1/0008 |
| CN | 104411438 A | * | 3/2015 | ............ B23K 1/0016 |
| CN | 103537773 B | * | 2/2016 | ............... B23K 3/00 |
| CN | 103476539 B | * | 8/2016 | ............ B23K 35/24 |
| CN | 106984880 A | * | 7/2017 | ............ B23K 1/002 |
| CN | 107112672 A | * | 8/2017 | ............ B23K 13/01 |
| CN | 107592830 A | * | 1/2018 | ............... B23K 3/02 |
| CN | 108723534 A | * | 11/2018 | ............ B23K 1/0008 |
| CN | 108886844 A | * | 11/2018 | ............ B23K 35/262 |
| CN | 110153520 A | * | 8/2019 | |
| CN | 113275688 A | * | 8/2021 | ............ B23K 1/002 |
| CN | 110722235 B | * | 3/2022 | ............... B23K 3/00 |
| CN | 116329691 A | * | 6/2023 | |
| DE | 102022109905 A1 | * | 10/2022 | ............ B23K 1/0016 |
| EP | 1657964 B1 | * | 5/2008 | ............... H05B 3/84 |
| EP | 3447846 A1 | * | 2/2019 | ......... B60R 13/0846 |
| EP | 3518616 A1 | * | 7/2019 | ............ B60J 1/002 |
| EP | 2448707 B1 | * | 3/2020 | ............ B23K 1/0008 |
| EP | 3804897 A1 | * | 4/2021 | ............... B23K 3/03 |
| JP | H0567719 A | * | 3/1993 | |
| JP | 2016500575 A | * | 1/2016 | |
| KR | 20150010759 A | * | 1/2015 | |
| KR | 20150072866 A | * | 6/2015 | |
| KR | 20180006874 A | * | 1/2018 | |
| WO | WO-2012096373 A1 | * | 7/2012 | ............ B23K 35/262 |
| WO | WO-2012118203 A1 | * | 9/2012 | ............ B23K 1/0008 |
| WO | WO-2013128161 A1 | * | 9/2013 | ............ B23K 1/0008 |
| WO | WO-2016177825 A1 | * | 11/2016 | ............ B23K 1/002 |

* cited by examiner

VEHICULAR WINDOW ASSEMBLY PROCESS WITH TEMPERATURE CONTROL OF THE SOLDER JOINT THAT ATTACHES AN ELECTRICAL CONNECTOR

CROSS REFERENCE TO RELATED APPLICATION

The present application claims the filing benefits of U.S. provisional application Ser. No. 63/363,389, filed Apr. 22, 2022, which is hereby incorporated herein by reference in its entirety.

FIELD OF THE INVENTION

The present invention relates to a window assembly for a vehicle and, more particularly, a window assembly with an electronic component disposed thereat.

BACKGROUND OF THE INVENTION

It is known to provide a window assembly for an opening of a vehicle where the window assembly has one or more electrical components disposed at a glass panel of the window assembly. For example, glass window panels often have a heating element established thereat to defog or defrost the window panel. The heating element typically includes respective heater grids that are electrically connected to a power source and heated responsive to actuation of a user input. Individual electrical connectors are soldered at the heater grids or busbars at the glass window panel and are configured to connect to the vehicle wire harness when the window assembly is installed.

SUMMARY OF THE INVENTION

A system or process for assembling a vehicular window assembly includes a heating device, such as an inductive heating device or a resistive heating device, that, when electrically operated, heats a button or electrical connector disposed at a glass panel of a vehicular window assembly to heat and melt solder disposed between the connector and the glass panel to form a solder joint thereat. The solder joint provides electrical connection between the electrical connector and an electrical component disposed at the glass panel, such as a heater grid. The system includes a temperature sensor, such as a high speed infrared (IR) temperature sensor, that captures sensor data indicative of a temperature at the electrical connector and/or solder. An electronic control unit (ECU) includes a data processor and the ECU processes the captured sensor data from the temperature sensor so that the system may control and/or adjust operation of the heating device responsive to the temperature at the solder joint to control and/or adjust the temperature of the electrical connector and/or solder during formation of the solder joint.

These and other objects, advantages, purposes and features of the present invention will become apparent upon review of the following specification in conjunction with the drawings.

DESCRIPTION OF THE PREFERRED EMBODIMENTS

Figure 1:
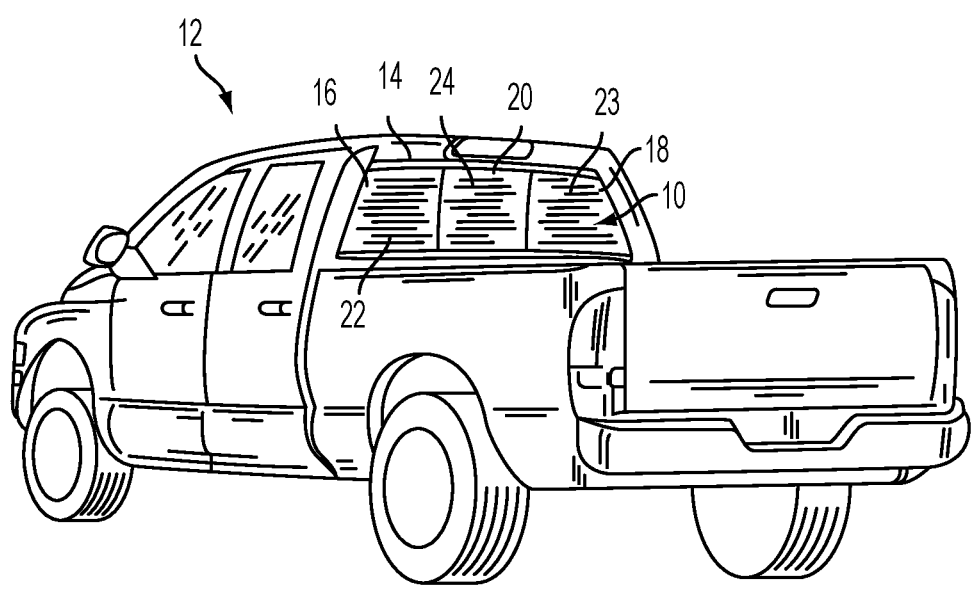
FIG. 1 is a rear perspective view of a pickup truck having a rear slider window assembly having a heater grid disposed at the glass panel of the window assembly.
Figure 2A:
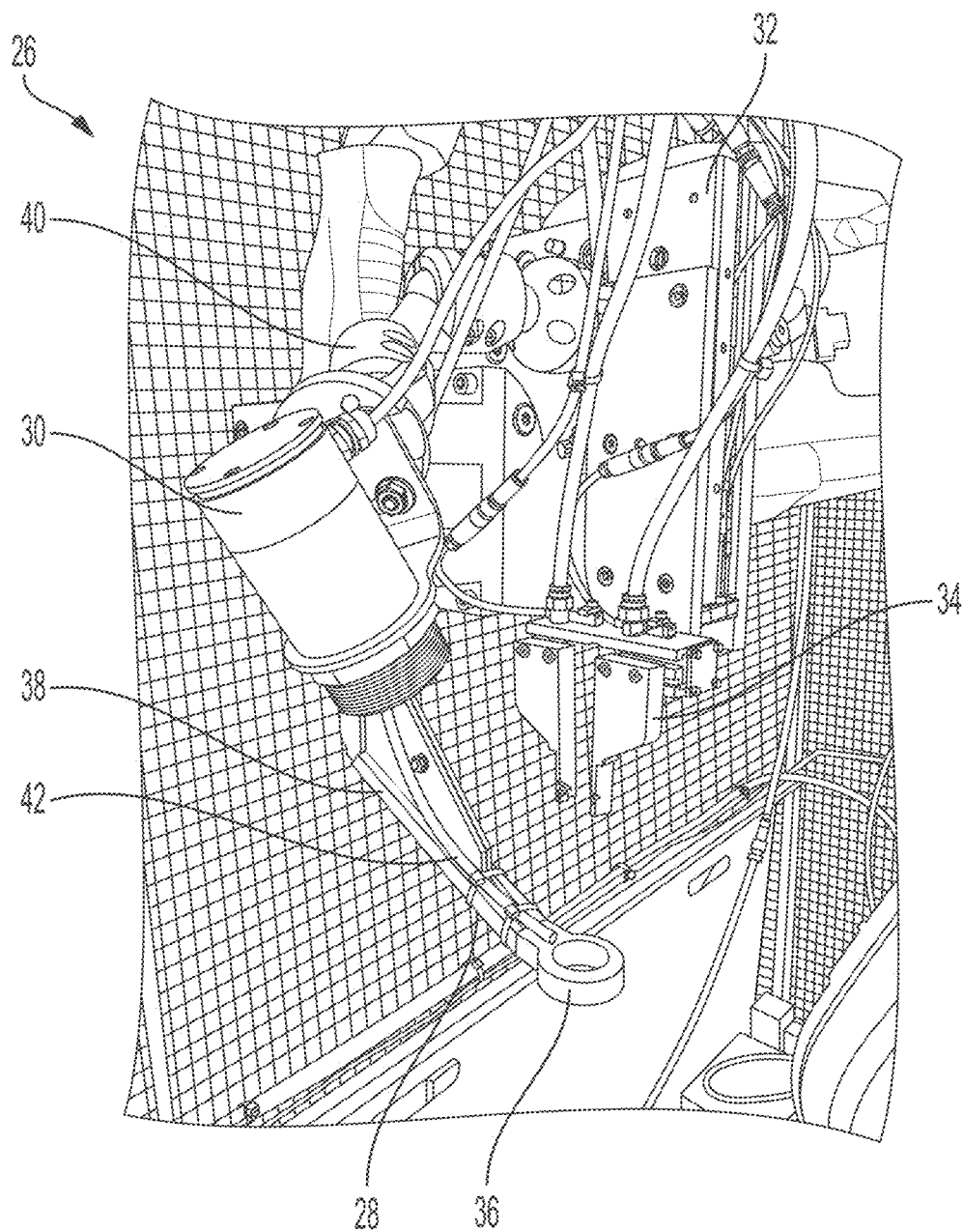
FIGS. 2A-2D are views of the system for assembling the vehicular window assembly having an induction heating device and a temperature sensor.
Figure 2D:
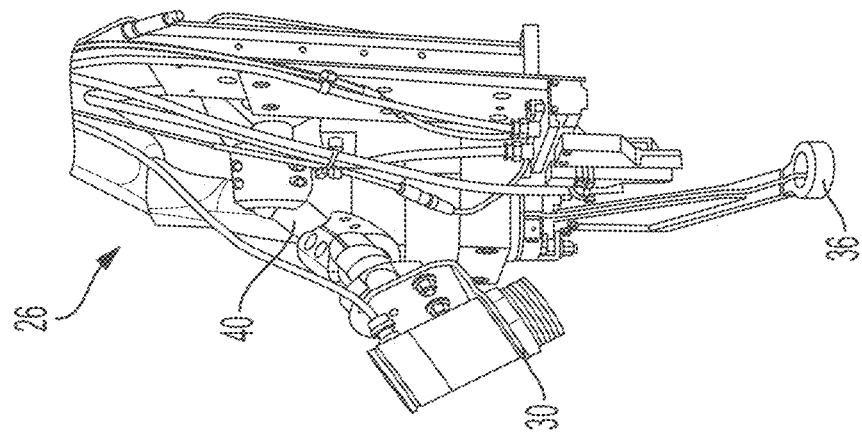
Figure 2C:
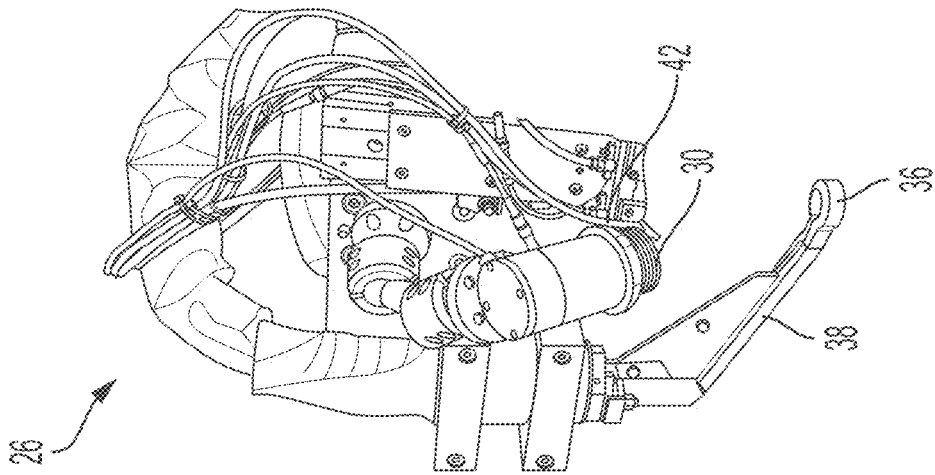
Figure 2B:
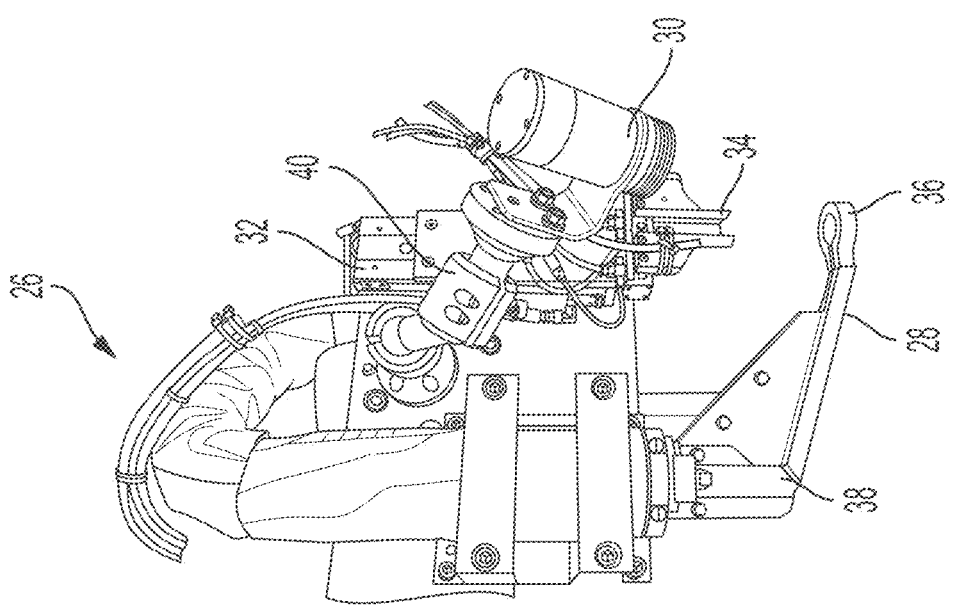

Electrically connecting an electrical component, such as a heater grid or lighting device or movable panel drive system or an antenna or a glass/panel breakage sensor, or the like, of a vehicular window assembly to a power source of a vehicle may include providing a direct electrical connection at a glass panel of the window assembly. For example, the electrical component may include an electrical connector disposed at the glass panel (such as at an electrically conductive trace or busbar established at a surface of the glass panel) and configured for electrical connection with the power source of the vehicle (such as connected to a wire harness of the vehicle) and solder (such as solder paste or a solder pad) may be positioned at the electrical connector and heated so that the solder melts between the electrical connector and the glass panel and is subsequently cooled to harden to form a solder joint between the electrical connectors and the panel (such as between the electrical connectors and the electrically conductive trace or busbar established at the surface of the glass panel).

Typically, this process includes electrically energizing a heating device to heat the solder and monitoring the current applied to the heating device or the energy used by the heating device during heating to control the heating process. For example, the process may heat the solder joint until a threshold amount of electrical current has been applied to the heating device, at which time the process may cease heating the solder as the solder and the button will be expected or approximated to be sufficiently heated to join the button or electrical connector at the glass panel. That is, existing processes may simply control current to a specified amount to set the approximate temperature at the solder. In other words, existing solder process equipment uses energy applied or energy used as its measure for the soldering of components to glass. This is achieved with a calculation and measurement of the system remote from the terminal that is being soldered to the glass panel.

Such existing processes may lead to incomplete heating or overheating and inconsistent outcomes across different solder joints, resulting in wider tolerances and less reliable electrical connections. For example, controlling heating based on energy applied to the heating device fails to account for differences in the material or size or orientation of the solder or electrical connectors (e.g., different compositions or sizes of material may require more or less energy to heat to comparable levels). In other words, any material variation in the solder or electrical connector (or misalignment of the heater and electrical connector) will result in variations in actual temperatures at the electrical connector during the soldering process for the same amount of energy applied or energy used in heating the solder.

As described further below, a system for assembling a vehicular window assembly includes a heating device (such as an inductive heating device or a resistive heating device), a temperature sensor (such as a high speed infrared (IR) temperature sensor), and an electronic control unit (ECU) having a data processor. The heating device, when electrically operated, heats solder disposed between a button or electrical connector and a glass panel of a vehicular window assembly to form a solder joint providing electrical connection to an electrical component disposed at the glass panel. The temperature sensor captures sensor data indicative of a temperature of the solder or of the electrical connector. The system, based on processing at the ECU of the captured sensor data from the temperature sensor, adjusts or controls electrical operation of the heating device to adjust or control the temperature of the solder or button during heating of the button and solder. Thus, the system is able to accurately monitor the temperature at the solder joint and adjust or control operation of the heating device based on the monitored temperature. For example, a program for forming the solder joint may call for the solder or button to be heated to a given or threshold temperature for at least a threshold period of time. Based on the processing of the captured sensor data, the system may know when the solder joint has reached the threshold temperature and for how long the temperature is maintained at or above the threshold temperature to satisfy the program and reliably and consistently create solder joints at the glass panel. That is, when the temperature at the solder is determined to have been at or above the threshold temperature for the required period of time, the system ceases operation of the heating device. Optionally, the system operates based on a heating program where the solder is heated to one or more different temperatures for one or more different time spans.

That is, the system uses real time temperature readings using a control protocol that allows the system to give the terminals or heating device a temperature profile for soldering instead of just an estimate of the amount of energy to be applied. This can better control and/or adjust the heating cycle and therefore increase the robustness of the joints. The system uses a high speed non-contact temperature sensor that feeds into a programmable logic controller (PLC). In the PLC, there is a proportional, integral, derivative loop (PID loop) that controls and/or adjusts the output of the heating device to maintain a programmed temperature profile. The temperature profile may also include cooling (e.g., cooling air or fluid may be applied to the joint or area after the temperature is determined to have reached the desired or target temperature for a desired or target period of time and cooling air or fluid may be applied based on continued capture of sensor data by the temperature sensor and processing of the captured sensor data). The system outputs a signal to the heating device, which controls and/or adjusts the current applied to the heating device based on the signal output by the sensor. This provides a much faster response and better control of the temperature at the solder button.

The system may be operable to apply solder joints at any suitable vehicular window assembly having any suitable electrical component disposed thereat, where the electrical component is electrically connected via a soldered joint disposed at the glass panel. For example, the window assembly having an electronic component disposed thereat may comprise a vehicular rear window assembly having an electrically operable heater grid disposed thereat, such as described in U.S. Pat. Nos. 10,843,644; 10,524,313; 9,579,955; 8,881,458 and/or 8,402,695, and/or U.S. Pub. Nos. US-2022-0295603; US-2021-0070241 and/or US-2021-0039481, which are all hereby incorporated herein by reference in their entireties, or a vehicular window assembly having an integrated lighting component, such as described in U.S. Pat. Nos. 10,501,008 and/or 9,896,026 and/or U.S. Publication No. US-2022-0072992, which is hereby incorporated herein by reference in its entirety, or a vehicular window assembly having an integrated camera and/or lighting component, such as described in U.S. Pat. No. 10,668,868, which is hereby incorporated herein by reference in its entirety, or a vehicular window assembly having an integrated touch or proximity sensor and/or display, such as described in U.S. Pat. Nos. 10,559,153 and/or 10,427,503, which are hereby incorporated herein by reference in their entireties, or a vehicular rear slider window assembly having a movable panel drive system disposed thereat for moving a slider window panel relative to one or more fixed window panels, such as described in U.S. Pat. Nos. 4,920,698; 4,995,195; 5,146,712; 5,531,046; 5,572,376; 6,119,401; 6,955,009; 7,073,293 and/or 10,501,977, and/or U.S. Publication Nos. US-2019-0383084; US-2008-0127563 and/or US-2004-0020131, which are all hereby incorporated herein by reference in their entireties, or a vehicular window assembly, such as a glass roof panel, having an electrically operable dimming or shadowing layer that adjusts the tint of the glass according to an electrical current applied to the layer at the glass panel, or a vehicular window assembly having an integrated antenna or an integrated glass/panel breakage sensor (for example, a loop of silver or other electrically conductive material may be applied to the glass panel so that when the resistance through the loop changes (due to broken glass), it can set off an alarm of the vehicle), or the like.

Referring now to the drawings and the illustrative embodiments depicted therein, FIG. 1 depicts an example of a vehicular window assembly having at least one electrical component disposed at a glass panel of the window assembly and assembled by the system and method described herein. FIG. 1 depicts a rear slider window assembly 10 of a vehicle 12 (such as a pickup truck or the like) that includes a window frame 14 (having upper and lower rails), a pair of side fixed window panels 16, 18 and a movable window panel 20 that is movable relative to the frame 14 and the fixed window panels 16, 18 between an opened position and a closed position. The fixed window panels 16, 18 each include an electrically conductive heater grid 22, 23 or other heating element or electrically operable element established at the window panels (such as at or on an interior surface of the window panels), and the movable window panel 20 includes an electrically conductive heater grid or other heating element or electrically operable element 24 established at the window panel (such as at or on an interior surface of the movable window panel). The window assembly may include a drive system that is electrically operable to move the movable window panel 20 relative to the fixed window panels 16, 18 between the closed position, where the movable window panel is disposed at an opening between the fixed window panels 16, 18, and the closed position, where the movable window panel is disposed at least partially along one of the fixed window panels 16, 18.

The heater grids 22, 23 are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels 16, 18. The movable panel heater grid 24 is electrically connected to the power source (and may be electrically connected to electrical terminals or elements at one of the heater grids 22, 23 of the fixed window panels) and may be electrically powered to heat or defrost or defog the movable window panel 20. As described further below, the electrical connections between the respective electrical components at the glass panels of the window assembly (e.g., the heater grids) comprise solder joints formed by heating a button or electrical connector disposed at the glass panel (and/or heating the solder that is disposed at the interface side of the electrical connector or at the glass panel so as to be between and joining the electrical connector and the electrically conductive trace or busbar at the glass panel). The electrical connectors may comprise buttons that are configured to snap attach to a corresponding connector of the vehicle wire harness or to a connector or jumper wire of the window assembly or may comprise spade connectors that are configured to be received in (or receive) a corresponding connector of the vehicle wire harness or a connector or jumper wire.

As shown in FIGS. 2A-2D, the system 26 for assembling the vehicular window assembly includes an inductive heating device 28 for heating the solder and/or button disposed at the glass panel, a temperature sensor 30 for measuring a temperature of the solder and/or button, and the control or electronic control unit (ECU) 32 for controlling operation of the system 26. The ECU 32 may be in direct wired communication with the heating device 28 and temperature sensor 30 or the ECU 32 may be disposed remote from and communicate wirelessly with the temperature sensor 30 and heating device 28.

The system 26 may include a dispensing mechanism 34, such as a gripper mechanism, for positioning and placing the button at the glass panel (and the button may have a solder paste disposed at its interface side that opposes the glass panel). The dispensing mechanism 34 may be movable relative to the heating device 28 and glass panel for positioning the button and/or the dispensing mechanism 34 may move with the heating mechanism 28 to the position of the placed button.

In the illustrated embodiment, the heating device 28 includes an induction head 36 (i.e., the round loop at the base of the end of arm tooling (EOAT)) that, when electrically operated, generates a magnetic field at the solder or button, where the generated magnetic field induces an electric current in the solder and/or button to heat the solder and/or button using induction heating. Thus, the solder and/or button comprises a ferromagnetic material that heats in response to the generated magnetic field. The induction head 36 may be movable via an arm 38 to position the heating device 28 at the solder joint location at the glass panel and electrical connection between the heating device 28 and a power source for electrically energizing the induction head 36 may be routed along or through the arm 38. The temperature sensor 30 views the solder joint and/or senses temperature at the solder joint during heating and may be adjustable relative to the heating device 28 via an adjustable or pivotable arm 40 at which the temperature sensor 30 is mounted to adjust the field of view or sensing of the temperature sensor 30.

The positioning of the button and solder at the glass panel via the dispensing mechanism 34, positioning of the heating device 28 at the solder joint location, and positioning of the temperature sensor 30 to view or sense the button and solder may all be automated and controlled by preprogrammed instructions provided to the ECU 32 or the system 26 may perform operations responsive to user inputs provided to the ECU 32. Optionally the system 26 may include one or more positioning sensors for positioning the button, solder, heating device, and/or temperature sensor relative to the solder joint location. For example, the IR temperature sensor 30 may also function as a position sensor for positioning the components of the system relative to one another.

With the button disposed at the solder joint location and the heating device 28 disposed near or at the solder joint location, the system 26 electrically operates the heating device 28 to heat the button and solder to melt the solder and form the solder joint providing electrically-conductive connection between the button and the electrical component disposed at the glass panel. As the heating device 28 heats the button and solder, the temperature sensor 30 captures sensor data indicative of the temperature at the button and the ECU 32 processes the sensor data for controlling operation of the heating device 28 according to a temperature profile for the solder joint.

Optionally, a cooling device 42, such as a cooling line providing cooling air flow, may be positioned proximal to the heating device and solder joint to cool the heating device 28 and/or heated button and/or solder. Based on the temperature output from the temperature sensor 30, the system 26 may control operation of the cooling device 42 to maintain optimal heating and cooling temperatures at the solder joint. For example, the heating device 28 may be operated to heat the solder joint to a first temperature that is greater than a first threshold temperature and, if the temperature at the solder joint reaches or exceeds a higher second threshold temperature, the cooling device 42 may be operated until the temperature at the solder joint is below the second threshold temperature. Thus, the operating temperature may be maintained within an acceptable temperature range (i.e., between the first and second threshold temperatures). For example, the first threshold temperature may be a melting point of the solder and the second threshold temperature may be a temperature at which damage to the glass panel at and near the solder joint or to the button could occur.

Figure 3B:
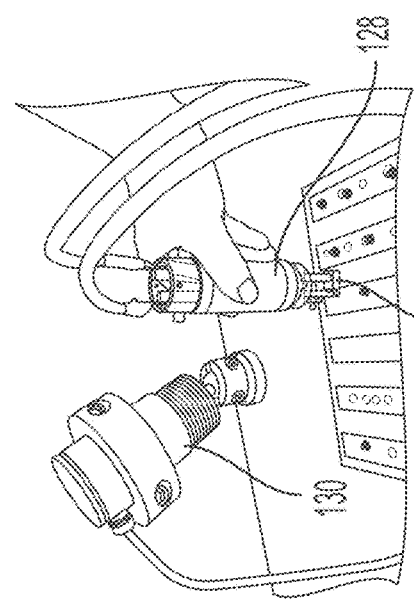
FIGS. 3A-3C are views of the system for assembling the vehicular window assembly having a resistive heating device and a temperature sensor.
Figure 3C:
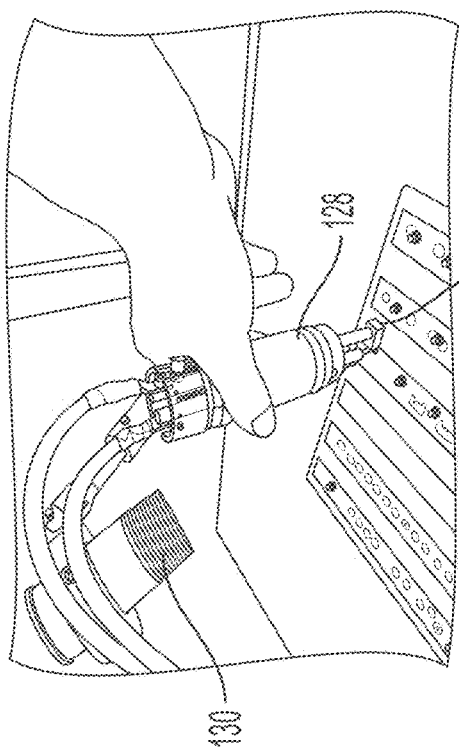
Figure 3A:
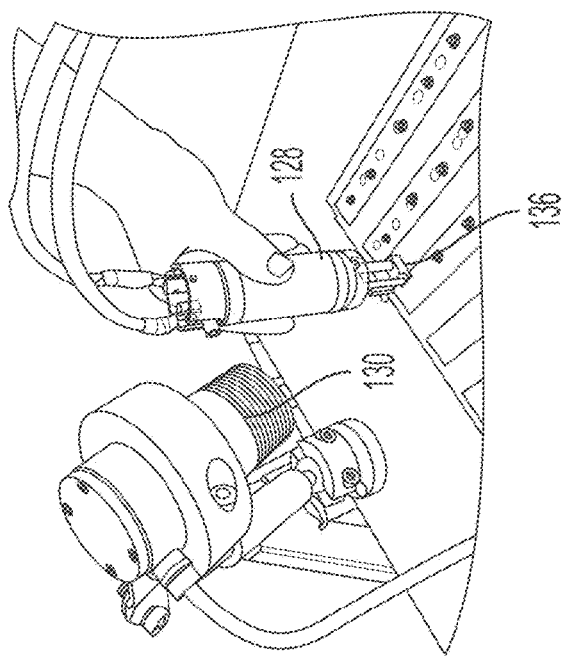

Optionally, and as shown in FIGS. 3A-3C, the system may include a heating device 128 that includes a resistive heating element 136 that directly engages the button at the glass panel to heat the button and solder and form the solder joint. When electrical current is provided to the resistive heating element 136, the resistive heating element 136 generates heat and the system, based on the temperature at the solder joint (as sensed by the temperature sensor 130), adjusts or controls the current provided to the resistive heating element 136 to adjust or control the heat provided and temperature at the solder joint. The resistive heating device 128 may comprise a handheld resistive heating device 128. Optionally, the resistive heating device 128 may be mechanically manipulated and integrated into a fully automated system, such as similar to the automated or robotically controlled inductive heating device 28 discussed above.

The system similarly includes the temperature sensor 130 disposed remote from the solder joint and capturing sensor data indicative of the temperature at the solder joint region where the system controls operation of the resistive heating element 136 based on the captured sensor data. Thus, the resistive heating device 128 may comprise a handheld device, but the system controls electrical operation and heating provided by the handheld heating device 128. For example, even if a user holds the resistive heating element 136 at the solder joint region longer than intended, the system may stop electrically operating the heating device 128 to stop heating the button and solder (and may provide cooling to control the temperature profile throughout the soldering process).

Figure 4:
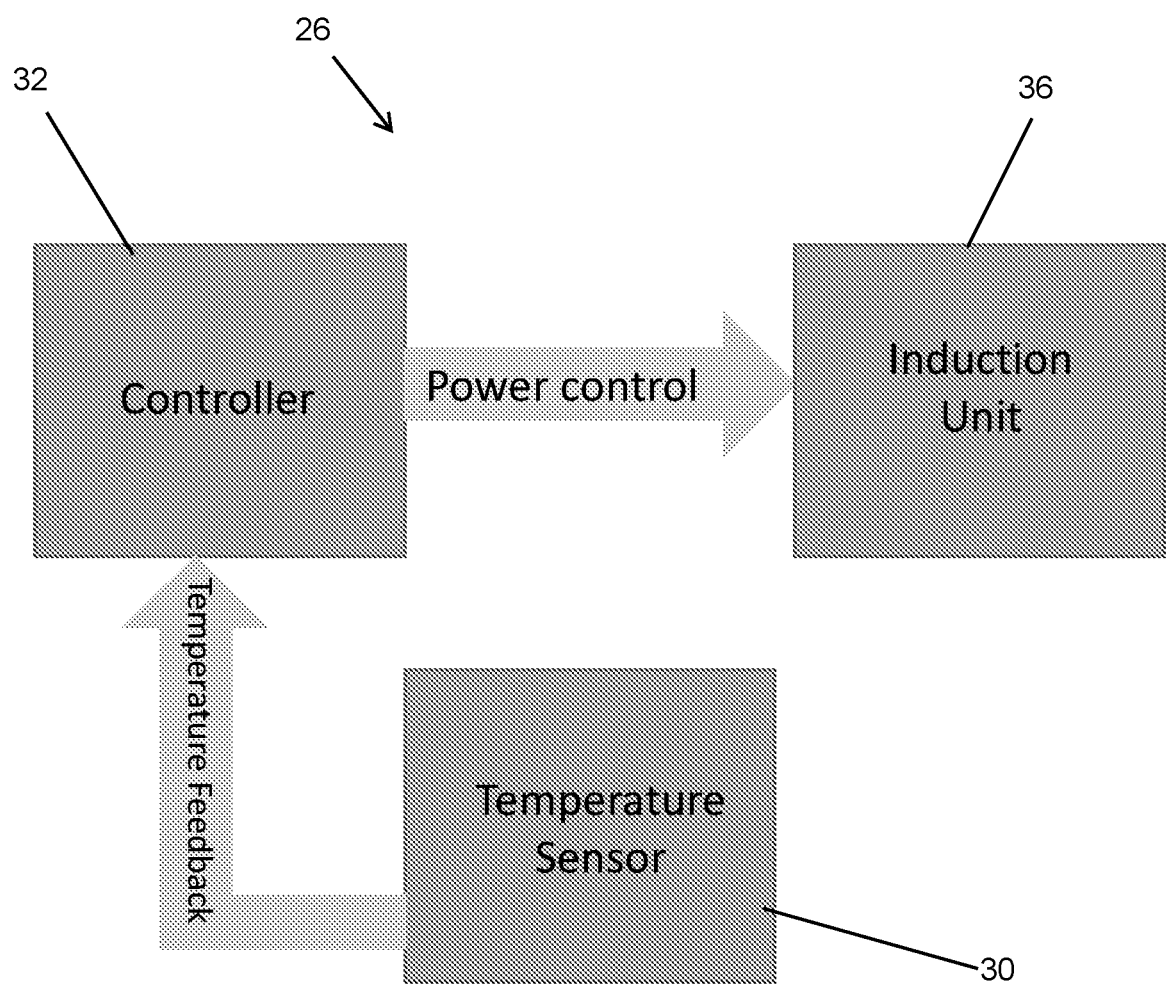
FIG. 4 is a schematic diagram showing control of the heating device based on sensor data captured by the temperature sensor of the system.
Figure 5:
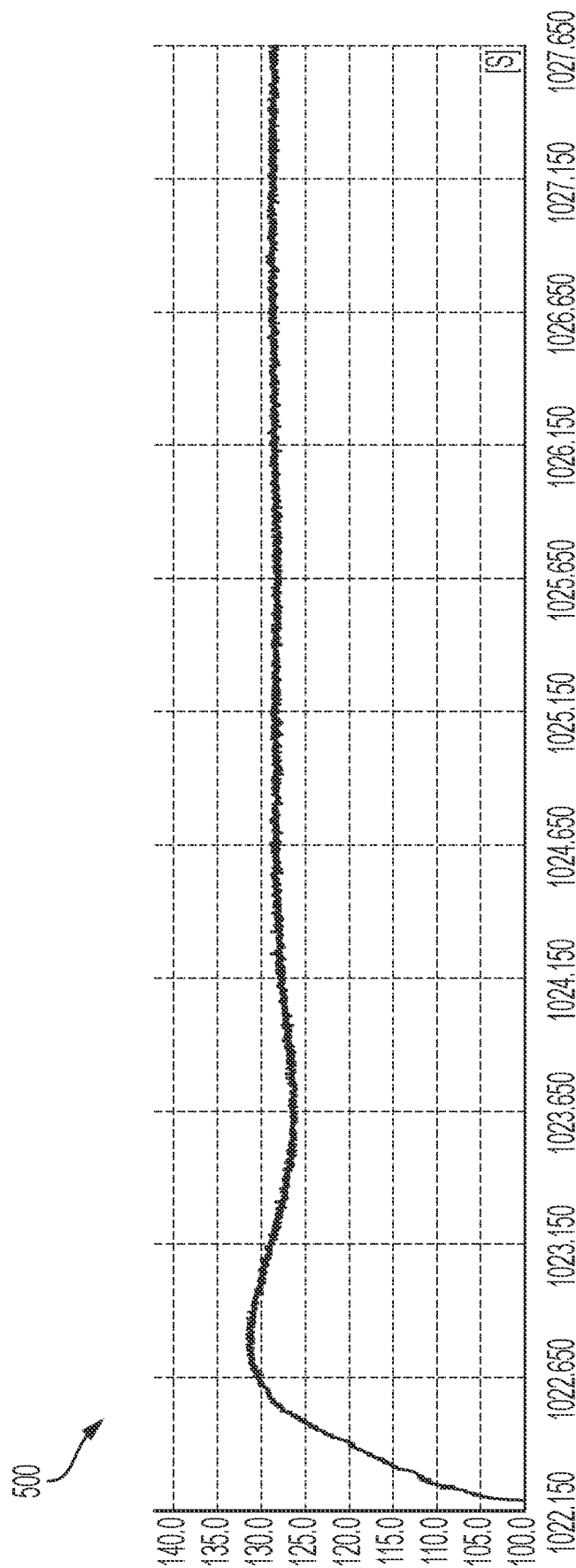
FIG. 5 is a chart showing the temperature recorded over time by the system while applying a solder joint at a glass panel.

Thus, and as shown in FIG. 4, the system 26 is able to provide more precise and fast responding temperature control for the formation of solder joints between electrical components and the electrically conductive traces or busbars disposed at vehicular glass window panels. FIG. 5 shows the temperature control of the system over time while forming a solder joint at a glass panel. As shown by the chart 500, the system is able to quickly achieve and maintain a stable temperature of the electrical connector and solder while forming the solder joint. The system 26 uses a temperature sensor 30 to monitor the temperature at the solder joint and processes the temperature feedback from the sensor 30 to control and adjust the power control provided to the heating device.

Optionally, the window assembly or assemblies may utilize aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and 5,853,895, and/or U.S. Publication Nos. US-2013-0174488; US-2011-0056140; US-2006-0107600; US-2008-0127563; US-2004-0020131 and/or US-2003-0213179, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A system for assembling a vehicular window assembly, the system comprising:
  a heating device that, when electrically operated, heats an electrical connector disposed at a glass panel of a vehicular window assembly to heat and melt solder disposed between the electrical connector and an electrically conductive trace established at the glass panel to form a solder joint providing electrically-conductive connection between the electrical connector and the electrically conductive trace established at the glass panel;
  a temperature sensor that captures sensor data indicative of a temperature of the electrical connector and the solder;
  an electronic control unit (ECU) comprising a data processor for processing captured sensor data from the temperature sensor;
  wherein the system, with the heating device being electrically operated to heat the electrical connector and the solder and based on processing at the ECU of the captured sensor data, adjusts electrical operation of the heating device to adjust the temperature of the electrical connector and the solder during the soldering process that forms the solder joint;
  wherein the temperature sensor comprises an infrared (IR) temperature sensor; and
  wherein the IR temperature sensor also functions as a position sensor for positioning the heating device at the electrical connector.

2. The system of claim 1, wherein the system, responsive to determination that the temperature of the electrical connector and the solder is greater than or equal to a threshold temperature, ceases electrical operation of the heating device.

3. The system of claim 1, wherein the system, with the heating device not being electrically operated and responsive to determination, via processing at the ECU of the captured sensor data, that the temperature of the electrical connector and the solder is less than or equal to a threshold temperature, electrically operates the heating device to increase the temperature of the electrical connector and the solder.

4. The system of claim 1, wherein the heating device comprises an induction heater that, when electrically operated, generates a magnetic field at the electrical connector to heat the electrical connector and the solder.

5. The system of claim 1, wherein the heating device comprises a resistive heater that, when electrically operated, generates heat at or near the electrical connector to heat the electrical connector and the solder.

6. The system of claim 1, further comprising a cooling device, that when operated, cools the electrical connector and the solder.

7. The system of claim 6, wherein the system, with the cooling device operated to cool the electrical connector and the solder and based on processing at the ECU of the captured sensor data, adjusts operation of the cooling device to adjust the temperature of the electrical connector during cooling of the electrical connector.

8. The system of claim 1, wherein the vehicular window assembly comprises a vehicular rear window assembly configured to be disposed at a rear portion of a cabin of a pickup truck.

9. The system of claim 8, wherein the vehicular rear window assembly comprises a fixed window panel having an opening and a movable window panel that is movable between a closed position, where the movable window panel is disposed at the opening, and an opened position, where the movable window panel is disposed at least partially along the fixed window panel, and wherein a drive system is electrically operable to move the movable window panel between the closed position and the opened position.

10. The system of claim 1, wherein the electrically conductive trace is electrically-conductively connected to a heater grid established at the glass panel.

11. A method for assembling a vehicular window assembly, the method comprising:
  providing a vehicular window assembly comprising a glass panel and an electrically conductive trace established at the glass panel;
  electrically operating a heating device to heat an electrical connector disposed at the glass panel to heat and melt solder disposed between the electrical connector and the electrically conductive trace to form a solder joint providing electrically-conductive connection between the electrical connector and the electrically conductive trace established at the glass panel;
  while electrically operating the heating device, capturing sensor data indicative of a temperature of the electrical connector and the solder using a temperature sensor and processing the captured sensor data at a data processor of an electronic control unit (ECU);
  based on processing of the captured sensor data, adjusting electrical operation of the heating device to adjust the temperature of the electrical connector and the solder during the soldering process that forms the solder joint;
  before electrically operating the heating device, positioning the electrical connector and solder at the electrically conductive trace established at the glass panel based on position data captured by a position sensor and processed at the ECU; and wherein the temperature sensor comprises an infrared (IR) temperature sensor that also functions as the position sensor.

12. The method of claim 11, further comprising, responsive to determination that the temperature of the electrical connector and the solder is greater than or equal to a threshold temperature, ceasing electrical operation of the heating device.

13. The method of claim 11, further comprising, responsive to determination that the temperature of the electrical connector and the solder is less than or equal to a threshold temperature, electrically operating the heating device to increase the temperature of the electrical connector and the solder.

14. The method of claim 11, wherein the temperature sensor comprises an infrared (IR) temperature sensor that is spaced from the electrical connector during electrical operation of the heating device.

15. The method of claim 11, wherein the heating device comprises an induction heater that, when electrically operated, generates a magnetic field at the electrical connector to heat the electrical connector and the solder.

16. The method of claim 11, wherein the heating device comprises a resistive heater that, when electrically operated, generates heat at or near the electrical connector to heat the electrical connector and the solder.

17. The method of claim 11, further comprising, before electrically operating the heating device and after positioning the electrical connector and solder at the electrically conductive trace, positioning the heating device at or near the electrical connector based on the position data captured by the position sensor and processed at the ECU.

18. The method of claim 11, further comprising, based on processing of the captured sensor data, controlling operation of a cooling device to cool the electrical connector and the solder.

* * * * *